(12) United States Patent
Miyata et al.

(10) Patent No.: US 7,618,703 B2
(45) Date of Patent: Nov. 17, 2009

(54) MESOSTRUCTURED FILM, MESOPOROUS MATERIAL FILM, AND PRODUCTION METHODS FOR THE SAME

(75) Inventors: Hirokatsu Miyata, Hadano (JP); Yasuhiro Kawashima, Sagamihara (JP); Kazuyuki Kuroda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 216 days.

(21) Appl. No.: 10/544,109

(22) PCT Filed: Aug. 5, 2004

(86) PCT No.: PCT/JP2004/011582

§ 371 (c)(1),
(2), (4) Date: Aug. 2, 2005

(87) PCT Pub. No.: WO2005/014480

PCT Pub. Date: Feb. 17, 2005

(65) Prior Publication Data

US 2006/0204758 A1    Sep. 14, 2006

(30) Foreign Application Priority Data

Aug. 8, 2003   (JP)   ............... 2003-290535
Feb. 5, 2004   (JP)   ............... 2004-029350

(51) Int. Cl.
 *B32B 3/10*   (2006.01)
 *B32B 3/12*   (2006.01)
(52) U.S. Cl. .................. 428/312.2; 428/137; 428/158; 428/312.6
(58) Field of Classification Search ............... None
See application file for complete search history.

(56) References Cited

U.S. PATENT DOCUMENTS 6,984,414 B2    1/2006   Miyata ................. 427/243

(Continued)

FOREIGN PATENT DOCUMENTS

WO   WO 2004/015167 A2   2/2004

OTHER PUBLICATIONS

Besson et al., "A New 3D Organization of Mesopores in Oriented CTAB Silica Films", J. Phys. Chem. B 2000, 104, 12095-12097, XP-002304393.

(Continued)

*Primary Examiner*—Timothy M Speer
(74) *Attorney, Agent, or Firm*—Fitzpatrick, Cella, Harper & Scinto

(57) ABSTRACT

A mesostructured film is provided having a structure in which surfactant molecular assemblies are regularly arranged three-dimensionally. A polymer compound thin film is formed on the substrate surface through spin coating or the like, and a rotating roller wrapped with a cloth is pressed against the polymer film for rubbing in one direction. The polymer material includes polyimide, polyamide, and polystyrene. The substrate includes a silica glass substrate and a silicon substrate. The mesostructured film can be formed by retaining the substrate in an aqueous solution containing a surfactant, silicon alkoxide, and acid. After being retained in the solution, the substrate is heated at about 60 to 120° C. for several hours to several days for reaction. The surfactant includes $C_{18}H_{37}(OCH_2CH_2)_{20}OH$ and $C_{16}H_{33}$ $(OCH_2CH_2)_{20}OH$. The alkoxide included tetraethoxysilane, tetramethoxysilane, and tetrapropoxysilane. Hydrochloric acid, nitric acid, or sulfuric acid is used as a catalyst.

14 Claims, 8 Drawing Sheets

U.S. PATENT DOCUMENTS

2002/0034626 A1* 3/2002 Liu et al. .................. 428/312.6
2003/0012931 A1 1/2003 Kuroda et al. ................ 428/188
2006/0062909 A1 3/2006 Miyata ........................ 427/226

OTHER PUBLICATIONS

Grosso et al., "Highly oriented 3D-hexagonal silica . . . bromide", J. Mater. Chem., vol. 10, No. 9, pp. 2085-2089 (2000).

Patent Abstracts of Japan, vol. 2003, No. 3 (2003).

Tolbert, et al., "A New Phase of Oriented Mesoporous . . . Thin Films"; Chem. Mater., vol. 9, No. 9, 1962-1967 (1997).

Zhao, et al; "Continuous Mesoporous Silica Films . . . Structures"; Adv. Mater., vol. 10, No. 16, 1380-1385 (1998).

Miyata, et al.; "Alignment of Mesoporous Silica . . . A Rubbing Method"; Chem. Mater., vol. 11, No. 6, 1609-1614 (1999).

* cited by examiner

MESOSTRUCTURED FILM, MESOPOROUS MATERIAL FILM, AND PRODUCTION METHODS FOR THE SAME

TECHNICAL FIELD

The present invention relates to a film having a novel nanometer-scale periodic structure, and more specifically to a structure, a mesostructured film, and a mesoporous material film each having a regular periodic structure formed through self-assembly and production methods for the same.

BACKGROUND ART

There are several reports on the preparation of a mesostructured film and a mesoporous material film each having a three-dimensional regular periodic structure. The preparation of silica mesostructured films having a cubic structure or a three-dimensional hexagonal structure through dip-coating using various surfactants has been reported in Advanced Materials, vol. 10, p. 1380 (1998). Further, an example in which using a double-headed ammonium surfactant containing two quaternary nitrogens bonded through a methylene group, a mesoporous silica film having a three-dimensional hexagonal structure is formed on a mica substrate through deposition has been reported in Chemistry of Materials, vol. 9, p. 1962.

Meanwhile, there are several reports on a technique of controlling a mesopore alignment of a mesostructured material at a macroscopic scale. A method using a polymer film subjected to rubbing treatment is reported in Chemistry of Materials, vol. 11, p. 1609.

However, in the above-described reports, there are some points to be improved.

First, a mesostructured film prepared through the solvent evaporation such as dip-coating has locally a three-dimensional regular structure on the substrate, but it is hard to highly control the regular structure across an entire substrate. In most cases, the structure is isotropic or slightly anisotropic to in-plane rotation when the structure of the entire substrate is averaged out. Further, in a technique of forming a mesostructured film having a three-dimensional regular structure through deposition on a substrate retained in a precursor solution, control of mesopore arrangement across the entire substrate has not been confirmed at a macroscopic scale. Further, a usable substrate is limited to mica, and a very special surfactant is needed.

Further, in a conventional technique of controlling orientation of mesopores in mesostructure silica at a macroscopic scale, the target structure is limited to a tubular pore structure of a two-dimensional hexagonal structure.

DISCLOSURE OF THE INVENTION

The present invention has been made in view of the above, and provides a mesostructured film having a structure of surfactant molecular assemblies regularly arranged three-dimensionally, which has an arrangement of the molecular assemblies highly controlled across an entire substrate, is arranged on an optional substrate using general surfactants and is applied to a novel X-ray optical device.

That is, the present invention provides a mesostructured film including amphiphilic molecular assemblies and a compound containing as a main component an inorganic material formed on the peripheries of the molecular assemblies regularly arranged three-dimensionally, the mesostructured film being formed on a substrate, in which: a local periodic structure in an optional section of the film in parallel with the substrate has a 6-fold axis perpendicular to the film plane; and symmetric reflective surfaces of the structure including the 6-fold axis are facing in the same direction across the entire film.

The present invention provides a mesoporous material film including holes regularly arranged three-dimensionally and an inorganic material as a main component, the mesoporous material film being formed on a substrate, in which: a local periodic structure in an optional section of the film in parallel with the substrate has a 6-fold axis perpendicular to the film plane; and symmetric reflective surfaces of the structure including the 6-fold axis are facing in the same direction across the entire film.

Further, the present invention provides a structure including spherical assemblies of amphiphilic molecules and a compound containing an inorganic material formed on the peripheries of the assemblies, in which: the amphiphilic molecular assemblies are, regularly arranged across the entire area of the structure; and the arrangement of the amphiphilic molecular assemblies has a 6-fold axis.

Still further, the present invention provides a production method for a mesostructured film including the steps of: preparing a substrate having an anisotropic surface; preparing a reactant solution containing two or more kinds of surfactants and an inorganic material precursor; and retaining the substrate having an anisotropic surface in the reactant solution.

The present invention provides a production method for a structure including assemblies of amphiphilic molecules and a compound containing an inorganic material formed on the peripheries of the assemblies, the production method for a structure including the steps of: preparing a substrate having an anisotropic surface and a solution containing an inorganic compound and having a molar concentration at which the amphiphilic molecules form spherical micelles; and retaining the substrate in the solution, thereby forming the structure on the substrate.

A substrate having an anisotropic surface is preferably used in the present invention.

A substrate having a polymer compound formed thereon and subjected to rubbing treatment is particularly preferably used in the-present invention. Polyimide is preferable as the polymer compound.

As described above, according to the present invention, a mesostructured film having a three-dimensional regular structure, in which a local structure in an optional section in parallel with a substrate surface has a 6-fold axis perpendicular to the film plane and in-plane orientation of an arrangement is identical across the entire substrate, can be created by forming a mesostructured film on the substrate having an anisotropic surface using appropriate surfactants under suitable conditions.

BEST MODE FOR CARRYING OUT THE INVENTION

Figure 1:
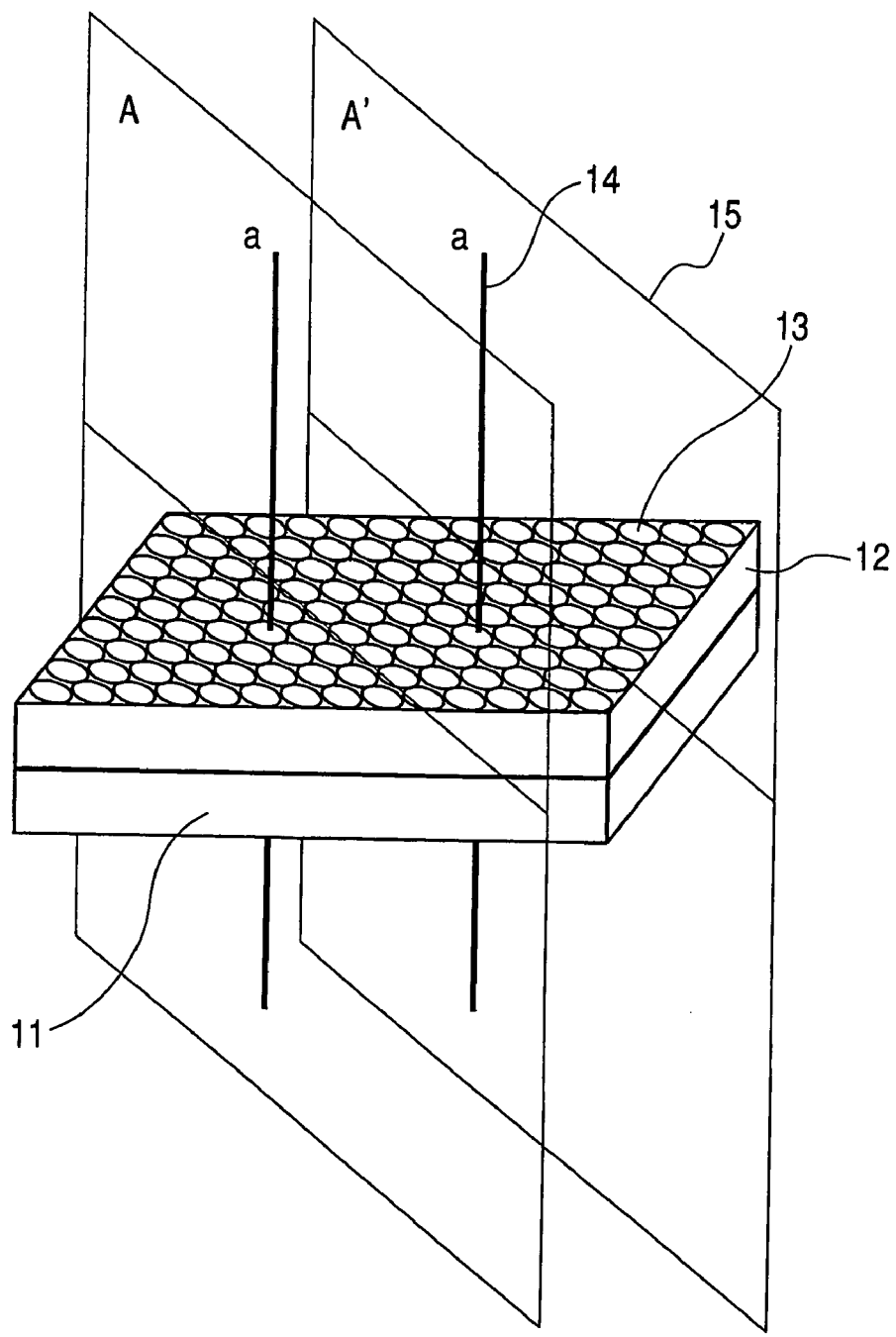
FIG. 1 is a schematic diagram of a mesostructured film and the mesoporous material film prepared in the present invention, in which a local periodic structure in an optional section of the film in parallel with the substrate has a 6-fold axis perpendicular to the film plane and symmetric reflective surfaces of the structure including the 6-fold axis are facing in the same direction across the entire film.

FIG. 1 is a schematic diagram showing the structure of the mesostructured film and mesoporous material film of the present invention in an optional section in parallel with a substrate surface. In the present invention, the mesostructured film and mesoporous material film 12 formed on a substrate 11 includes a local periodic structure in an optional section having a 6-fold axis "a" perpendicular to the film plane. Further, identical symmetric reflective surfaces A of the structure including the 6-fold axis "a" are facing in the same direction across the entire film at a centimeter scale or more. That is, A and A' planes are parallel anywhere in the substrate in FIG. 1. In FIG. 1, amphiphilic molecular assemblies or pores 13 exposed at the outermost surface are represented by circles for simple explanation. However, actually, spherical or nearly spherical amphiphilic molecular assemblies or pores are typically arranged in closest packing three-dimensionally, thereby forming a three-dimensional regular structure. However, a structure of the mesostructured film and mesoporous material film in the present invention is not limited thereto, and any structure having regularity related to the above symmetry can also be applied.

A mesostructured film in the present invention is a composite structure film composed of amphiphilic molecular assemblies and a compound containing as a main component an inorganic material formed on the peripheries of the molecular assemblies regularly arranged three-dimensionally. That is, a film containing surfactants is referred to as the mesostructured film. Further, the film of hollow structures formed through removal of the surfactants from the film is referred to as the mesoporous material film. The term "meso" as used herein corresponds to a size of 2 nm or more and 50 nm or less, and to a diameter of a section of an amphiphilic molecular assembly or mesopore, when the section of the film is assumed to be circular.

Hereinafter, production methods for the mesostructured film and mesoporous material film in the present invention will be described.

First, a production method for the target mesostructured film in the present invention will be described. Various reports on the production method for the mesostructured film may be roughly classified into two methods including: a method called solvent evaporation; and a method based on heterogeneous nucleation and growth on a substrate. The mesostructured film in the present invention may be produced through either method as long as direction control of amphiphilic molecular assemblies or pores as described above can be attained on the substrate.

The method based on heterogeneous nucleation and growth is satisfactorily used for the present invention. The production method will be described below.

First, a production method for a substrate will be described.

In the present invention, use of a substrate having a polymer film with an anisotropic surface formed thereon will be described. However, the substrate having an anisotropic surface applicable to the present invention is not limited thereto, and a crystalline substrate having an anisotropic surface such as the (110) plane of silicon can be used as long as the target structure can be produced. In such a case, it is a matter of course that a step of forming a polymer thin film described below is not required. A polymer thin film with an anisotropic surface can be produced through a method such as rubbing treatment or a Langmuir-Blodgett method. However, the method of forming a polymer with an anisotropic surface used in the present invention is not limited to the above two methods, and any methods inducing anisotropy can be applied. Anisotropy may be imparted through polarized irradiation, for example.

First, the rubbing treatment will be described. A thin film of a polymer is formed on a substrate surface through a method such as spin-coating or dip-coating, and a rotating roller wrapped with a cloth is pressed against the thin film for rubbing in one direction. A polymer material used is not particularly limited inasmuch as the material withstands the production process of a mesostructured film described below. Examples of the polymer material that can be used include polyimide, polyamide, and polystyrene. For example, a polyimide thin film can be formed by: applying polyamic acid, which is a precursor, on a substrate; and then subjecting the substrate to heat treatment. Any material can be used for the substrate on which a polymer film is formed as long as the material withstands the production process of a mesostructured film described below. Examples of the substrate that can be satisfactorily applied include a silica glass substrate and a silicon substrate. A thickness of a polymer thin film is not particularly limited, and is preferably in the range of several nano meters to several hundreds nano meters. A material for the cloth wrapped Around a rubbing roller is not particularly limited, and examples thereof include cotton and nylon. Anisotropy imparted through the rubbing treatment varies depending on the structure of the polymer used. It is considered that there are a case where anisotropy may be imparted mainly to only shape and a case where anisotropy is imparted to shape and polymer structure. In the present invention, both the cases are usable as long as the alignment of the mesopores formed on the polymer thin film can be controlled accordingly.

Next, the Langmuir-Blodgett method will be described. The Langmuir-Blodgett method is formed by transferring a monomolecular layer consisting of an amphiphilic material formed at a gas-liquid interface onto a substrate, and can be formed as a film of a desired number of layers by repeating this film formation. The "Langmuir-Blodgett film" as used herein refers to not only a film formed at a gas-liquid interface and transferred onto the substrate, but also a film transferred onto the substrate and then subjected to treatment for modification. A Langmuir-Blodgett film can also be formed from a polymer compound.

For example, a method of forming a Langmuir-Blodgett film of polyimide will be described. An alkylamine salt of polyamic acid, which is a precursor of the target polyimide, is synthesized. The salt is dissolved in an appropriate solvent, and is added dropwise onto a water surface. Thus, a monomolecular film of polyamic acid can be formed on the water surface. A Langmuir-Blodgett film of polyamic acid having a desired thickness is formed by immersing and extracting a substrate into and from the water. After film formation, the film is subjected to heat treatment in a nitrogen atmosphere for dehydration imidation and deamidation, thereby forming a Langmuir-Blodgett film of polyimide. An infrared absorption spectroscopy or the like of the Langmuir-Blodgett film of polyimide confirmed that polymer chains are oriented in a transfer direction of the substrate during film formation.

Next, a mesostructured film is formed on a substrate having an anisotropic polymer surface thereon produced as described above. Hereinafter, the present invention will be described regarding a mesostructured silica film produced through a method based on heterogeneous nucleation and growth on a substrate, but the present invention is not limited thereto.

The mesostructured silica film can be formed by retaining the substrate in an aqueous solution containing a surfactant which is an amphiphilic molecule, silicon alkoxide which is a silica source, and an acid serving as a hydrolysis catalyst. On the substrate, surfactant micelles which are amphiphilic molecular assemblies and an alkoxide precursor which is produced through hydrolysis and is a silica precursor form a mesostructured silica film regularly arranged through self-assembly.

Figure 2:
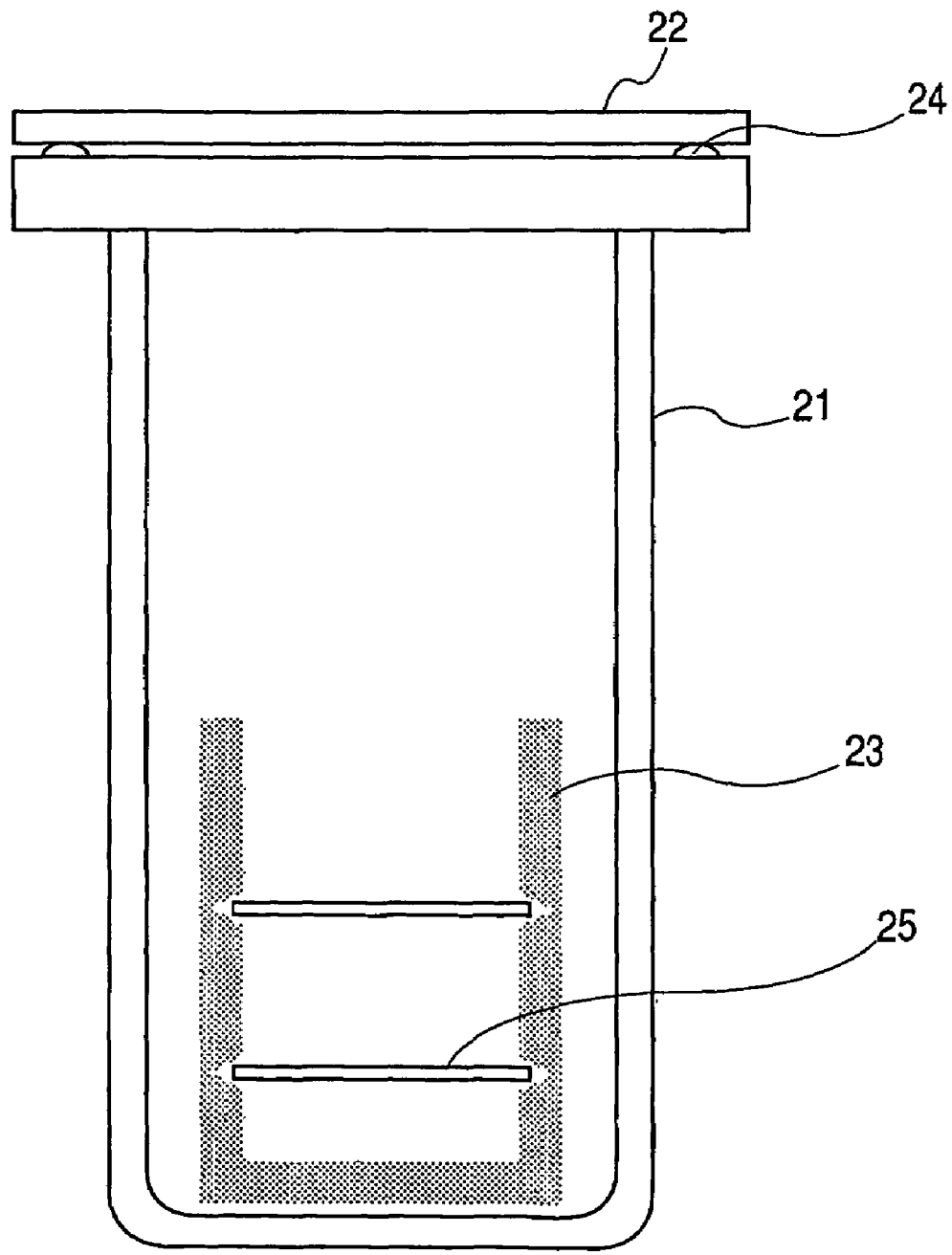
FIG. 2 is a schematic diagram showing a reaction vessel used in production of the mesostructured film in the present invention, in which a local periodic structure in an optional section of film in parallel with the substrate has a 6-fold axis perpendicular to the film plane and symmetric reflective surfaces of the structure including the 6-fold axis are facing in the same direction across the entire film.

FIG. 2 is a schematic diagram showing a reaction vessel used for film formation. A material for a reaction vessel 21 is not particularly limited as long as the material is inert and does not participate in reaction. An example of the material preferably used includes Teflon (trademark). A substrate 25 is retained in a solution and then placed in a heating device at about 60 to 120° C., if required, for reaction for several hours to several days. The reaction vessel is provided with a cover 22 and sealed with an O-ring 24 or the like for preventing destruction of the vessel or leak from the 20 vessel during heating. The reaction vessel of FIG. 2 may be placed in a stronger vessel of stainless steel or the like.

A nonionic surfactant containing ethylene oxide as a hydrophilic group is preferably used as a surfactant, and examples thereof include $C_{19}H_{37}(OCH_2CH_2)_{20}OH$, and $C_{16}H_{33}(OCH_2CH_2)_{20}OH$. A mixture of two or more surfactants can also be used. The two or more surfactants have preferably common identical hydrophobic structure and hydrophilic polyethylene oxide with different molecular length from each other. Examples of the mixtures that can be used include: a mixture of $C_{16}H_{33}(OCH_2CH_2)_2OH$ and $C_{16}H_{33}(OCH_2CH_2)_{10}OH$; and a mixture of $C_{18}H_{37}(OCH_2CH_2)_{20}OH$ and $C_{18}H_{37}(OCH_2CH_2)_{10}OH$. However, the surfactant and the mixtures of the two or more surfactants that can be used are not limited to the above, and any mixtures may be used as long as the target structure can be provided.

Examples of alkoxide that can be satisfactorily used as a silica source include tetraethoxysilane, tetramethoxysilane, and tetrapropoxysilane.

Hydrochloric acid, nitric acid, sulfuric acid, or the like is used as an acid serving as a hydrolysis catalyst, but hydrochloric acid is most generally used.

Concentrations of a surfactant, an acid, and a silica source greatly affect a mesostructure to be formed. Inappropriate conditions may result in a discontinuous film or a mesostructure not having the target three-dimensional regular structure. A mesostructured film is formed under the conditions optimized for a surfactant to be used through evaluation on the structure, morphology, or the like of the final film.

X-ray diffraction analysis is generally used for structural evaluation of a film. $\theta$-$2\theta$ scanning is used for investigating a periodic structure in parallel with a substrate, and rocking curve measurement of in-plane X-ray diffraction analysis is used for investigating symmetry on the film plane. Cross-sectional transmission electron microscopy can also be effectively used.

Optical microscopes and scanning electron microscopes are used for morphological observation of a film. Observation of scanning electron microscopes is preferably carried out under low acceleration voltage without metal deposition.

If required, surfactants are removed from the mesostructured silica film produced as described above, thereby forming a mesoporous silica film. The removal of the surfactant increases a difference in electron density between silica walls and the inside of the mesopores. Thus, X-ray scattering intensity tends to increase, but at the same time the mesostructure may be distorted, lowering regularity.

Any methods among the various methods of removing the surfactant can be used as long as the method allows removal of the surfactant without destruction of a pore structure.

A method most generally used involves calcining in an atmosphere containing oxygen. For example, calcination of a mesostructured silica film in air at 550° C. for 10 hours results in complete removal of an organic component while the pore structure is retained. A polymer film formed on a substrate surface is also removed in this case, and thus, the final structure includes a mesoporous silica film directly formed on the substrate.

A method of removing the surfactant through extraction with a solvent or using a supercritical fluid is known as a method of removing the surfactant in addition to the calcination. When using such a method, it is hard to remove an organic component completely, but it makes it possible to form a mesoporous silica film on a substrate of a material not withstanding high temperatures during calcination.

Further, ozone oxidation is also possible as a method of removing the surfactant in addition to calcination and extraction. The method also allows removal of the surfactant at temperatures lower than that in calcination.

The film of the present invention may contain the surfactant in pores or may not contain the surfactant through removal of the surfactant as long as the film has the target structure. Further, the film may contain a material in the pores except the surfactant.

When the mesostructured film and mesoporous film of the present invention are evaluated through in-plane X-ray diffraction, six diffraction peaks are observed every 60° within the range of 360° in a rocking curve profile of in-plane periodic structure.

The result indicates that the film of the present invention has a 6-fold axis perpendicular to a film plane. Further, in the in-plane X-ray diffraction analysis, an incident angle is close to a total reflection critical angle and is very small. Thus, adjusting a sample to be analyzed to an appropriate size provides averaged information across the entire sample film. The measurement of the film of the present invention under the conditions allowing measurement of the entire film resulted in the above-described diffraction peaks. This indicates that lattice planes providing the diffraction peaks of 6-fold rotational symmetry are in the identical direction across the entire film.

Further, when two or more kinds of surfactants are mixed to be used, the full width of the half maximum of the diffraction of the rocking curve profile observed in the in-plane X-ray diffraction analysis become significantly small. This indicates that the distribution of in-plane pore orientation is narrow and structural controllability has been improved.

In addition to the above method based on heterogeneous nucleation and growth on the substrate, a method based on the sol-gel method is satisfactorily used. Such a production method will be described below. The production method involves: coating the substrate with a precursor solution containing surfactants, a silica precursor, water, and an acid as a hydrolysis catalyst, or setting the solution at an optional position on the substrate; and carrying out reaction such as solvent drying, condensation and the like. Examples of satisfactory solvent for the precursor solution used in the method include alcohols such as ethanol and isopropanol, but are not limited thereto.

The precursor solution having such a composition is applied onto the substrate or set at an optional position on the substrate. Various coating methods such as dip-coating, spin-coating, and mist-coating can be used. Other methods can be used inasmuch as they allow uniform coating. A device used for spin-coating or dip-coating can be general one and is not particularly limited. The device may be provided with controller of temperature of the solution and temperature and humidity of an atmosphere in which the coating is carried out.

A production method for a mesostructured film using dip-coating will be described as an example.

Figure 3:
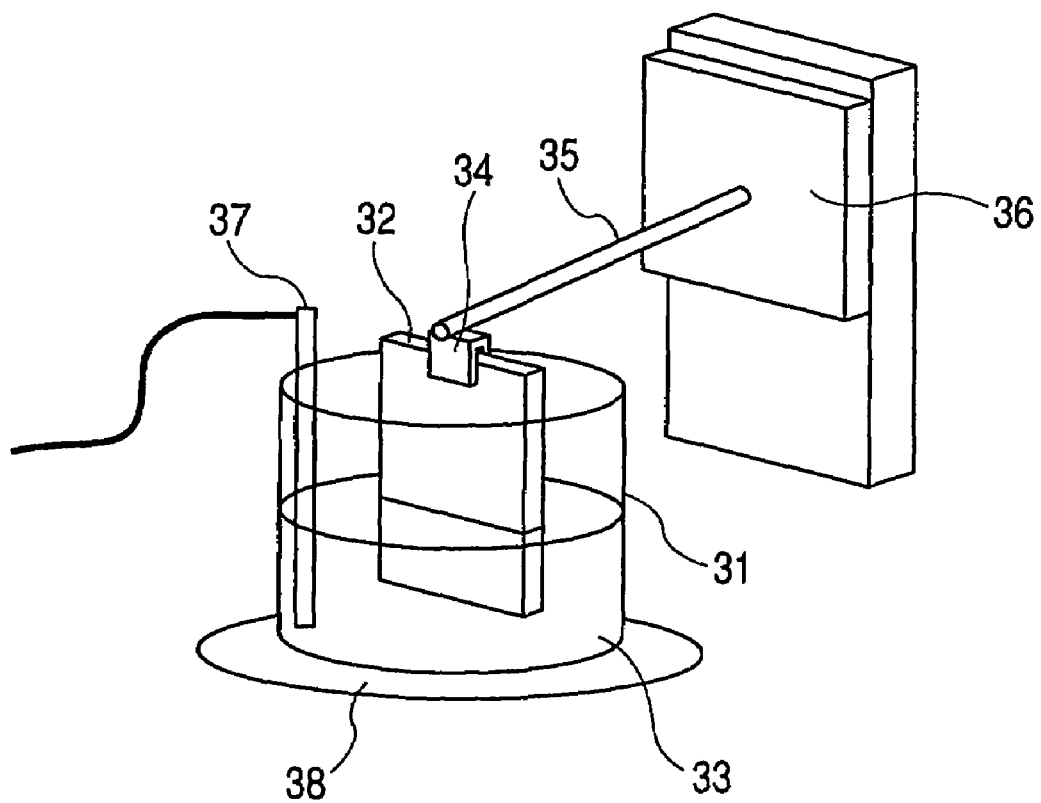
FIG. 3 is a schematic diagram showing a dip coating apparatus for the mesostructured film in the present invention, in which a local periodic structure in an optional section of the film in parallel with the substrate has a 6-fold axis perpendicular to the film plane and symmetric reflective surfaces of the structure including the 6-fold axis are facing in the same direction across the entire film.

FIG. 3 is a schematic diagram showing an example of a device used for dip-coating. In FIG. 3, reference numerals 31, 32, and 33 represent a vessel, a substrate, and a precursor solution, respectively.

A substrate on which a mesostructured thin film is formed is fixed to a rod 35 using a substrate holder 34 and moved upward and downward with a z stage 36.

During film formation, the precursor solution 33 is controlled to desired temperature, if required, a heater 38 and a thermocouple 37. For improving the controllability of the solution temperature, the entire vessel may be placed in an insulated container (not shown). A thickness of the thin film can be controlled by changing the coating conditions.

Further, various methods such as microcontact printing method, inkjet method, and pen lithography method can be used as a method of applying the precursor solution at an optional position onto the substrate. Such methods allow patterning of a mesostructured thin film at a desired position on the substrate.

Soft lithography is a technique for pattern formation involving: pressing an elastic mold (micromold) made from a material such as polydimethylsiloxane onto the substrate; introducing the precursor solution from the edge of the mold by capillarity; polymerizing a material forming pore walls to form a mesostructure; and then removing the mold to produce a pattern. The method allows very easy patterning of a mesostructure if the structure is simple.

Pen lithography involves: using a precursor solution as ink; and applying the solution from a tip of a pen to draw lines. A pen shape, a transfer rate of the pen or a substrate, a fluid supply rate to the pen, or the like may be varied to change line widths freely. Lines with widths of μm order to mm order can be drawn at present. Optional patterns such as straight lines and curved lines can be drawn, and sheet patterning is possible by overlapping spreads of the reactant solution applied on the substrate.

Further, an inkjet method is effective for drawing a pattern of discontinuous dots. The method involves: using reactant solution as ink; and discharging a constant amount of the solution as droplets from an inkjet nozzle for coating. Further, linear patterning and sheet patterning are possible by carrying out coating so that spreads of the reactant solution applied on the substrate overlaps. An emission amount of one droplet can be controlled to be several pico liters in the inkjet method at present. Thus, very minute dots can be formed, and the method is advantageous in patterning of minute dot shapes.

Further, according to those coating methods such as pen lithography and ink jet method desired patterns can be easily determined by using a computer system such as CAD. Thus, the coating methods differ from usual patterning by photolithography involving changing masks, and are very advantageous in production efficiency when various patterns are formed on various substrates.

The film of the present invention has such a feature that a structural period of the film is longer by one digit or more as compared to a structural period of a crystal, and shows stronger diffraction with soft X-rays of a longer wavelength region as compared to X-rays causing diffraction of crystals. Thus, the film of the present invention can be applied to an optical film using a long periodic structure and using the diffraction with X-rays of long wavelengths at large angles.

As described above, the gist of the present invention is characterized by controlling a three-dimensional structure of a material having nano-scale spacings at a macroscopic scale at high levels through a simple method based on self-assembly; and applying the structural regularity thus controlled to X-ray optical materials.

Hereinafter, the present invention will be described in more detail by way of Examples, but the present invention is not limited to the Examples.

EXAMPLE 1

Example 1 is an example in which using a substrate having a polyimide film formed thereon and subjected to rubbing treatment, a mesostructured silica film is formed on the substrate to produce an optical material thin film in soft X-ray region. The mesostructured silica film has a structure with a 6-fold axis perpendicular to the film plane and has symmetric reflective surfaces of the structure including the 6-fold axis in the same direction across the entire film. FIG. 1 schematically illustrates the structure of the film produced in Example 1.

An NMP solution of polyamic acid A was applied through spin-coating onto a silica glass substrate washed with acetone, isopropyl alcohol, and pure water and having a surface cleaned in an ozone generating apparatus. The substrate was then calcined at 200° C. for 1 hour, to thereby form polyimide A having the following structure.

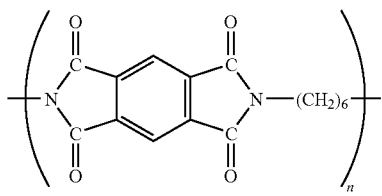

Rubbing treatment was carried out under the conditions shown in Table 1, thereby forming a substrate.

TABLE 1

| Cloth material | Nylon |
|---|---|
| Roller diameter (mm) | 24 |
| Pressing (mm) | 0.4 |
| Rotation (rpm) | 1,000 |
| Stage rate (mm/min) | 600 |
| Number of repeats | 2 |

A mesostructured silica film was formed on this substrate. A surfactant used in Example 1 was a nonionic surfactant polyethylene oxide 20 octadecyl ether ($C_{18}H_{37}(CH_2CH_2O)_2$ OH, abbreviated as $C_{18}EO_{20}$ below) having polyethylene oxide as a hydrophilic group.

0.92 g of $C_{18}EO_{20}$ was dissolved in 129 ml of pure water, and 20.6 ml of concentrated hydrochloric acid (36%) was added thereto. After sufficient stirring of the mixture, 2.20 ml of tetraethoxysilane (TEOS) was further added to the solution, and was stirred for 3 minutes. The final molar ratio of respective components in the solution was TEOS:$H_2O$:HCl: $C_{18}EO_{20}$=0.125:100:3:0.01.

The substrate having polyimide A formed thereon and subjected to rubbing treatment was retained in the reactant solution with the side on which the film was to be formed facing down. A Teflon (trademark) vessel 21 of the constitution as shown in FIG. 2 containing the reactant solution was sealed for reaction at 80° C. for 3 days. A cover was placed on the surface through a spacer during reaction, thereby obtaining a satisfactory uniaxially oriented mesostructured silica film.

A substrate 25 held in contact with the reactant solution for a given time was taken out from the vessel, sufficiently washed with pure water, and naturally dried at room temperature. As a result, a continuous film of the mesostructured silica was formed on the substrate. The thickness of the mesostructured silica film was determined using a stylus profilometer, and was about 200 nm.

Figure 4:
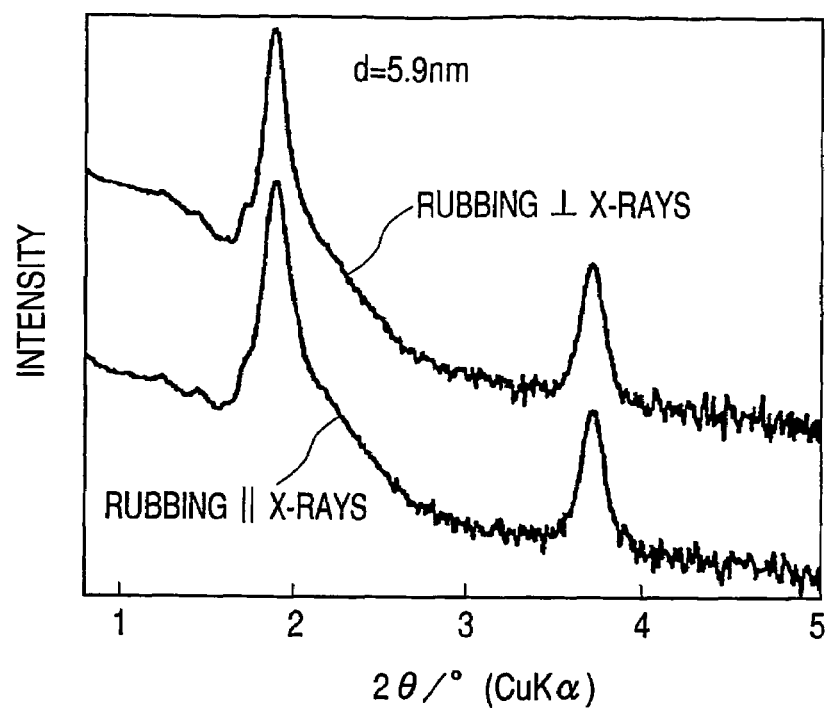
FIG. 4 shows θ-2θ scanning X-ray diffraction patterns measured for the mesostructured film produced in Example 1 of the present invention.

The film was subjected to θ-2θ scanning X-ray diffraction analysis with CuKα radiation, and two sharp diffraction peaks corresponding to plane interval of 5.96 nm and 3.00 nm respectively, were observed as shown in FIG. 4. No difference appeared in diffraction patterns between a case where the measurement was carried out in the direction of a substrate plane projection component of incident X-rays parallel with the rubbing direction and a case where the measurement was carried out in the direction of a substrate plane projection component of incident X-rays perpendicular to the rubbing direction.

The structure of the film was more specifically analyzed through in-plane X-ray diffraction analysis with CuKα radiation. The measurement method is described in Chemistry of Materials, vol. 11, p. 1609, for example, and provides information regarding lattice planes not horizontal with the substrate, which cannot be observed by θ-2θ scanning.

Figure 5:
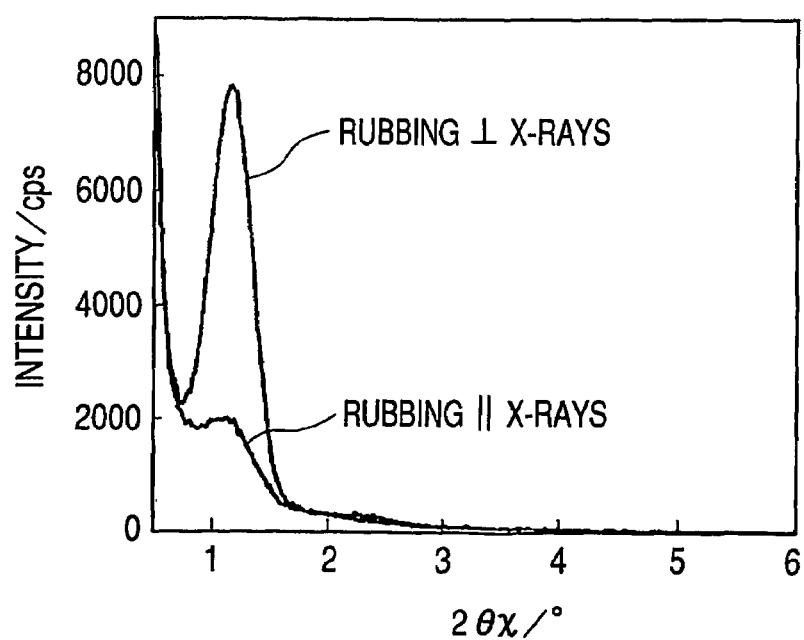
FIG. 5 shows diffraction patterns illustrating anisotropy of in-plane X-ray diffraction patterns measured for the mesostructured film produced in Example 1 of the present invention.

The in-plane X-ray diffraction analysis showed diffraction peaks at plane interval of 7.64 nm and 3.79 nm as shown in FIG. 5. The intensities of the diffraction peaks were small with measurement in such an initial arrangement that the substrate plane projection component of the incident X-rays was parallel with the rubbing direction. The intensities were large with measurement in such an initial arrangement that the substrate plane projection component of the incident X-rays was perpendicular to the rubbing direction, thereby confirming strong in-plane anisotropy in the orientation of the lattice plane.

Figure 6:
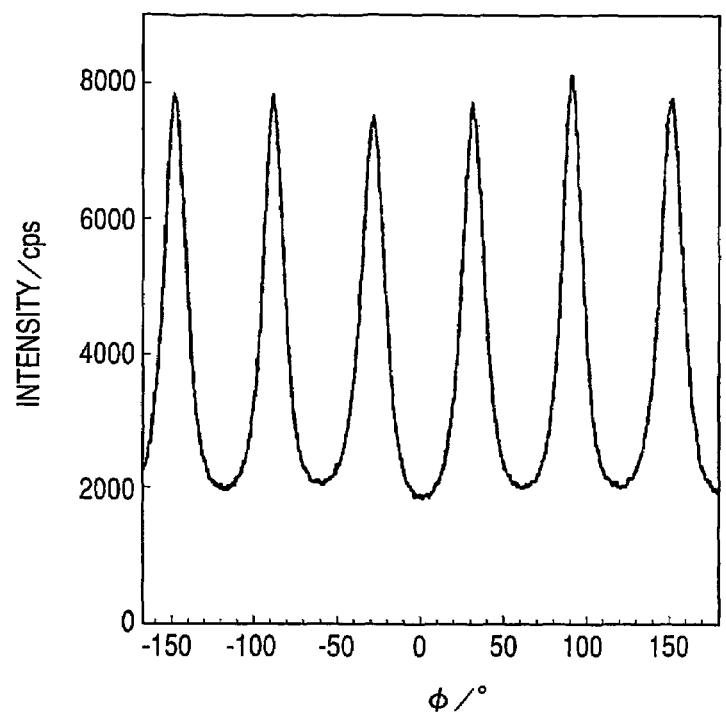
FIG. 6 shows an in-plane rocking curve of a lattice plane corresponding to a peak having greater intensity among the in-plane X-ray diffraction peaks measured for the mesostructured film produced in Example 1 of the present invention.

Next, a detector was fixed at positions of plane interval of 7.46 nm and 3.79 nm in the in-plane X-ray diffraction analysis and the sample was subjected to in-plane rotation, to investigate the orientation of the plane. As a result, diffraction peaks were observed every 60° at equal intervals as shown in FIG. 6. Positions of diffraction peaks were in directions of +150°, +90°, +30°, −30°, −90°, and −150° with respect to the rubbing direction.

The above results showed that the mesostructured film produced in the present invention has a structure with a 6-fold axis perpendicular to the film plane. An incident angle of X-rays was 0.2° in the in-plane X-ray diffraction analysis. The entire sample corresponds to the analysis region, and thus, in-plane orientation is identical across the entire substrate. In other words, symmetric reflective surfaces of the structure each including the 6-fold axis are facing in the same direction across the entire film.

Next, the film was calcined in air to remove the surfactant. The film was heated to 550° C. at a temperature increase rate of 2° C./min, maintained at the temperature for 10 hours, and then cooled to room temperature. Infrared absorption spectroscopy or the like showed that no organic components remained in the calcined film.

The calcined film was analyzed by X-ray diffraction, and the diffraction peaks similar to those in FIG. 4 were observed, thereby confirming that the structure was retained even after removal of the surfactant. However, positions of the diffraction peaks shifted to higher angles as compared to peak positions in FIG. 4, indicating that a structural period perpendicular to the film plane shortened through calcination. This results from shrinkage of a structure through dehydration condensation of a silanol group of silica constituting pore walls.

Further, the calcined sample film was analyzed through in-plane X-ray diffraction, and the diffraction patterns substantially identical to those in FIG. 5 were obtained. The result showed that the shrinkage of the structure occurs only in a direction perpendicular to the substrate surface and that the in-plane periodic structure does not change through calcination.

In-plane rocking curve was measured for the calcined sample by fixing a detector at positions of the in-plane diffraction peaks and rotating the sample. A pattern substantially identical to that in FIG. 6 was observed, indicating that in-plane structural regularity was slightly changed by removal of the surfactant through calcination.

An example in which the mesoporous silica film produced as described above is used as an X-ray optical device will be described below.

Figure 7:
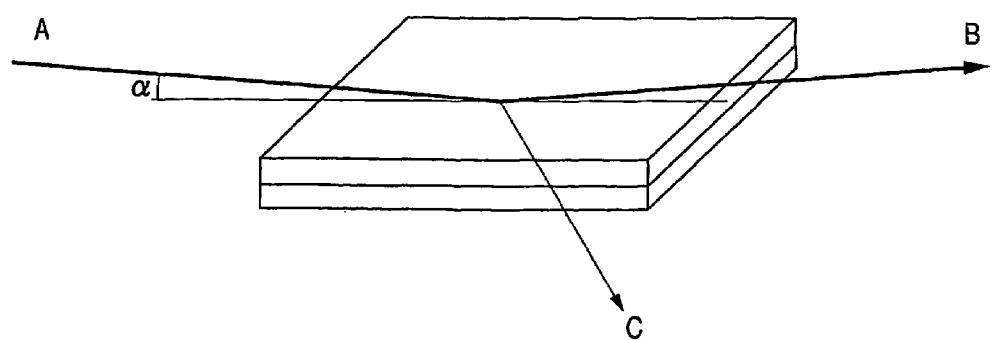
FIG. 7 is a diagram showing a structure of an X-ray optical device using the present invention.

X-rays were incident on the mesoporous silica film produced in Example 1, arranged shown in FIG. 7. The X-rays used were soft X-rays of wavelength 13 nm. The soft X-rays are absorbed by air. Thus, X-ray source, a sample holder holding the mesoporous silica film, and a detection surface of a detector are provided in vacuum. An incident angle a is set to be an angle substantially identical to the total reflection critical angle of the sample for the arrangement in Example 1. Incident X-rays AO to the sample with the arrangement almost totally reflect at an interface, reflection (OB) at an angle identical to the incident angle on the sample surface.

A structural period in the in-plane direction of the film produced in Example 1 was 7.89 nm, and a diffraction angle was 55.5° with CuKα radiation. Thus, with a suitable sample direction, the diffracted X-rays (OC) are emitted at this angle.

In the present invention, a sample holder is provided with a two-direction tilt angle adjustment stage, Z stage for a height adjustment, and φ stage for in-plane rotation of the sample. Thus, the incident angle can be adjusted to an optimum value.

Intensity of light diffraction has correlation with incident X-rays when an optical system of such structure is used. Thus, incident X-ray intensity can be determined while using X-ray beam for analysis or the like by monitoring the diffraction peaks.

Further, by rotating the substrate at a constant rate, the intensities of the diffraction peaks are unevenly emphasized.

As described above, the film of Example 1 can be applied to a novel X-ray optical device.

COMPARATIVE EXAMPLE 1

A mesostructured silica film was produced using a silica glass substrate washed with acetone, ethanol, and pure water and having the surface cleaned with ozone, and following the procedure shown in Example 1. A transparent continuous mesostructured silica film was formed on the substrate in this step.

The film was analyzed through θ-2θ scanning X-ray diffraction with CuKα radiation, and diffraction peaks substantially identical to those in FIG. 4 were observed. Diffraction patterns substantially identical to those in FIG. 5 observed in Example 1 were also obtained through in-plane X-ray diffraction analysis. The results showed that a mesostructured silica film can be formed directly on the silica glass in Comparative Example 1.

In-plane rocking curve measurement was also carried out for the film produced in Comparative Example 1 by fixing a detector to the in-plane diffraction peaks. However, no periodic intensity change as in Example 1 was observed, indicating that the structure formed was random in the plane.

That is, the results indicated that structures having similar symmetry are formed locally when no anisotropy is imparted to the substrate, and that the orientation cannot be identical across the entire substrate.

EXAMPLE 2

Example 2 is an example of production of: a Langmuir-Blodgett film of polyimide on a substrate; a mesoporous silica film having a structure with a 6-fold axis perpendicular to the film plane and having symmetric reflective surfaces of the structure each including the 6-fold axis in the same direction across the entire film; and an optical material thin film in soft X-ray region. FIG. 1 schematically shows the structure of the film prepared in Example 2.

Figure 8:
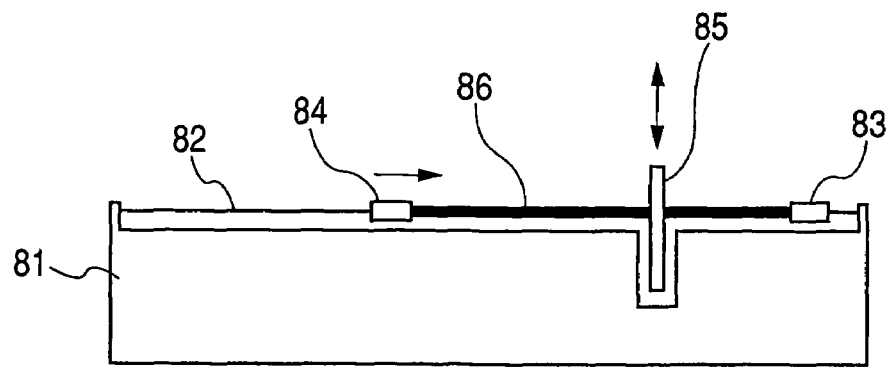
FIG. 8 is a schematic diagram showing apparatus for preparing a Langmuir-Blodgett film of polyimide in Example 2 of the present invention.

Polyamic acid B and N,N-dimethylhexadecylamine were mixed in a molar ratio of 1:2, to prepare an N,N-dimethylhexadecylamine salt of polyamic acid B. The salt was dissolved in N,N-dimethylacetamide to prepare a 0.5 mM solution, and the resultant solution was added dropwise onto a water surface of an LB film formation device maintained at 20° C. FIG. 8 shows a schematic diagram of the LB film formation device. A monomolecular film formed on the water surface was transferred onto the substrate at a dip rate of 5.4 mm/min while the constant surface pressure of 30 mN/m was applied. The substrate used was a silica glass substrate washed with acetone, isopropyl alcohol, and water and having a surface cleaned in an ozone generating apparatus. After formation of a 30-layer LB film of an alkylamine salt of polyamic acid on the substrate, the film was calcined in stream of nitrogen gas at 300° C. for 30 minutes, thereby forming an LB film of polyimide B having the structure described below. An infrared absorption spectroscopy indicated imidation through dehydration ring closure of the polyamic acid and desorption of alkylamine.

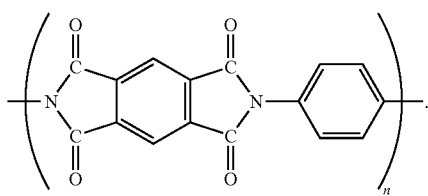

A polarized infrared absorption spectroscopy indicated that the polyimide thin film produced in Example 2 has a polymer chain oriented in parallel with a direction of the substrate pulled out during film formation.

A mesostructured silica film was formed on the 5 substrate. A surfactant used in Example 2 was a nonionic surfactant polyethylene oxide 20 cetyl ether ($C_{16}H_{33}(CH_2CH_2O)_{20}OH$, abbreviated as $C_{16}EO_{20}$ below) having polyethylene oxide as a hydrophilic group.

0.90 g of $C_{16}EO_{20}$ was dissolved in 129 ml of pure water, and 20.6 ml of concentrated hydrochloric acid (36%) was added thereto. After sufficient stirring of the mixture, 2.20 ml of tetraethoxysilane (TEOS) was further added to the solution, and was stirred for 3 minutes. The final molar ratio of respective components in the solution was $TEOS:H_2O:HCl:C_{16}EO_{20}=0.125:100:3:0.0075$.

The substrate having a Langmuir-Blodgett film of polyimide B formed thereon was retained in the reactant solution with the side on which the film was to be formed facing down. The Teflon (trademark) vessel 21 of the constitution as shown in FIG. 2, which is the same as that in Example 1, containing the reactant solution was sealed for reaction at 80° Cl. for 3 days. A cover was placed on the surface through a spacer during reaction, thereby obtaining a satisfactory uniaxially oriented mesostructured silica film.

The substrate 25 held in contact with the reactant solution for a given time was taken out from the vessel, sufficiently washed with pure water, and naturally dried at room temperature. As a result, a continuous film of a mesostructured silica was formed on the substrate. A thickness of the mesostructured silica film was determined using a stylus profilometer, and was about 200 nm.

The film was subjected to θ-2θ scanning X-ray diffraction analysis with CuKα radiation, and two sharp diffraction peaks corresponding to plane intervals of 5.60 nm and 2.80 nm respectively, were observed as in FIG. 4. No difference appeared in diffraction patterns between a case where the measurement was carried out in the direction of a substrate plane projection component of incident X-rays parallel with the rubbing direction and a case where the measurement was carried out in the direction of a substrate plane projection component of incident X-rays perpendicular to the rubbing direction.

The structure of the film was more specifically analyzed through in-plane X-ray diffraction analysis. The in-plane X-ray diffraction analysis showed a diffraction peak at a plane interval of 7.35 nm, as in FIG. 5. Two diffraction peaks were observed in Example 1, but no clear diffraction peak was observed at a position corresponding to half of the period in Example 2.

The intensities of the diffraction peaks were small with measurement in such an initial arrangement that the substrate plane projection component of the incident X-rays was parallel with the rubbing direction. The intensities were large with measurement in such an initial arrangement that the substrate plane projection component of the incident X-rays was perpendicular to the rubbing direction, thereby confirming strong in-plane anisotropy in orientation of the lattice plane even in the film produced in Example 2.

Next, a detector was fixed at a position of a plane interval of 7.35 nm in the in-plane X-ray diffraction analysis, and the sample was subjected to in-plane rotation, investigating the orientation of the plane. As a result, a substantially identical profile was obtained as in FIG. 6 and diffraction peaks were observed every 60° at equal intervals. Positions of the diffraction peaks were in directions of +150°, +90°, +30°, −30°, −90°, and −150° with respect to the rubbing direction.

The above results showed that the mesostructured film produced in the present invention has a structure with a 6-fold axis perpendicular to the film plane. An incident angle of X-rays was 0.2° in the in-plane X-ray diffraction analysis. The entire sample corresponds to an analysis region, and thus, in-plane orientation of the structure is identical across the entire substrate. In other words, symmetric reflective surfaces of the structure each including the 6-fold axis are facing in the same direction across the entire film.

The mesostructured silica film produced in Example 2 was then calcined under the same conditions as those in Example 1 to remove the surfactant, thereby forming a mesoporous silica film.

The calcined film was analyzed by X-ray diffraction, and the result indicated that a structural period was shrank only in a thickness direction.

The film produced in Example 2 upon X-ray analysis exhibited similar behavior to the film in Example 1, and thus, the film can be applied to the optical device described in Example 1.

EXAMPLE 3

In Example 3, a substrate having a polyimide film formed thereon and subjected to the same rubbing treatment as in Example 1 was produced. A mesostructured silica film was formed on the substrate. A surfactant used in Example 3 was a mixture of two kinds of surfactants respectively having hydrophilic polyethylene oxide portions different in size and having identical hydrophobic alkyl chains. The surfactant contained polyethylene oxide 20 hexadecyl ether ($C_{16}H_{33}(CH_2CH_2O)_{20}OH$, abbreviated as $C_{16}EO_{20}$ below) and polyethylene oxide 10 hexadecyl ether ($C_{16}H_{33}(CH_2CH_2O)_{10}OH$, abbreviated as $C_{16}EO_{10}$ below) mixed in a molar ratio of $C_{16}EO_{10}:C_{16}EO_{20}=2:1$.

0.32 g of $C_{16}EO_{10}$ and 0.26 g of $C_{16}EO_{20}$ were dissolved in 129 ml of pure water, and 20.6 ml of concentrated hydrochloric acid (36%) was added thereto. After sufficient stirring of the mixture, 2.20 ml of tetraethoxysilane (TEOS) was further added to the solution, and was stirred for 3 minutes. The final molar ratio of respective components in the solution was $TEOS:H_2O:HCl:C_{16}EO_{10}:C_{16}EO_{20}=0.125:100:3:0.0059:0.0029$.

The substrate having polyimide A formed thereon and subjected to rubbing treatment was retained in the reactant solution with the side on which the film 20 was to be formed facing down; The Teflon (trademark) vessel 21 of the constitution as shown in FIG. 2 containing the reactant solution was sealed for reaction at 80° C. for 3 days. A cover was placed on the surface through a spacer during reaction, thereby obtaining a satisfactory uniaxially oriented mesostructured silica film.

The substrate 25 held in contact with the reactant solution for a given time was taken out from the vessel, sufficiently washed with pure water, and naturally dried at room temperature. As a result, a continuous film of a mesostructured silica was formed on the substrate. A thickness of the mesostructured silica film was determined using a stylus profilometer, and was about 400 nm.

The film was subjected to θ-2θ scanning X-ray diffraction analysis with CuKα radiation, and diffraction peaks corresponding to plane intervals of 5.3 nm and 2.7 nm were observed at 1.66° and 3.24°, respectively. Anisotropy was observed in the diffraction patterns between a case where the measurement was carried out in the direction of a substrate plane projection component of incident X-rays parallel with the rubbing direction (pattern a in FIG. 9) and a case where the measurement was carried out in the direction of a substrate plane projection component of incident X-rays perpendicular to the rubbing direction (pattern b in FIG. 9). That is, two diffraction peaks in addition to the above two diffraction peaks were observed in the case where the measurement was carried out in the rubbing direction of the sample perpendicular to the X-rays. Such anisotropy of the diffraction patterns indicates that the film has strong structural anisotropy.

The structure of the film was more specifically analyzed through in-plane X-ray diffraction analysis with CuKα radiation as in Example 1. The in-plane X-ray diffraction analysis showed two diffraction peaks at $2θ_χ=1.18°$ and 2.36°, and the result shown in FIG. 10 which is similar to the result of Example 1 shown in FIG. 5 was observed, thereby confirming strong in-plane anisotropy in orientation of the lattice plane.

Figure 11:
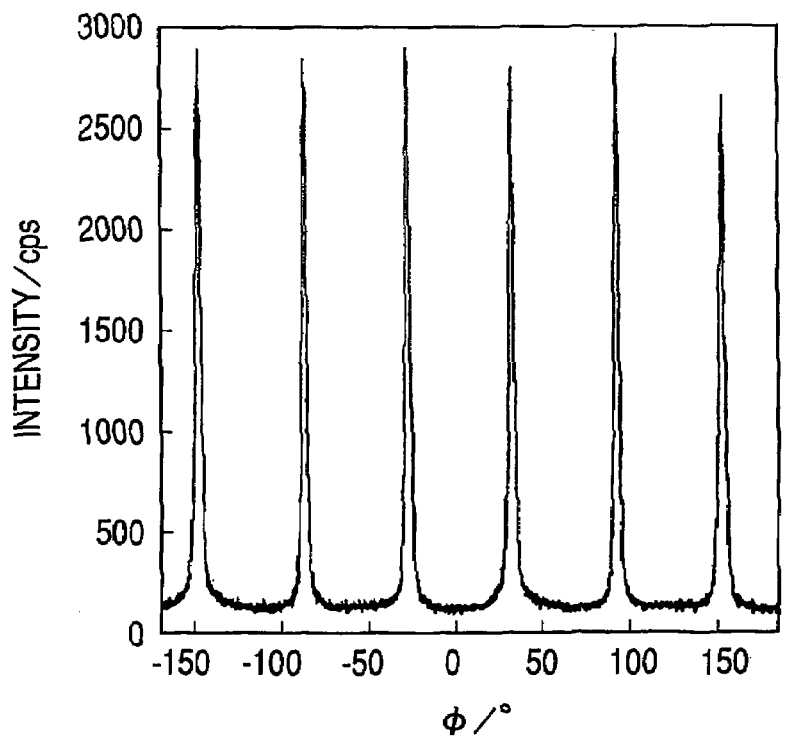
FIG. 11 shows an in-plane rocking curve of a lattice plane corresponding to a peak having greater intensity among the in-plane X-ray diffraction peaks measured for the mesostructured film produced in Example 3 of the present invention.

Next, a detector was fixed at a position of $2θ_χ=1.18°$ in the in-plane X-ray diffraction analysis, and the sample was subjected to in-plane rotation, investigating the orientation of the plane. As a result, sharp diffraction peaks were observed every 60° at equal intervals as shown in FIG. 11. The positions of the diffraction-peaks were in directions of +150°, +90°, +30°, −30°, −90°, and −150° with respect to the rubbing direction. The full width of the half maximum of the diffraction in the rocking curve of Example 3 in FIG. 11-*observed* through in-plane X-ray diffraction analysis are smaller than those of Example 1 in FIG. 6, indicating a narrow distribution of in-plane pore orientation and improved structural controllability.

From the above results, it was confirmed that the structure of the mesostructured film produced in Example 3 includes a 6-fold axis perpendicular to the film plane, and that the distribution of the orientation is very narrow. An incident angle of X-rays was 0.2° in the in-plane X-ray diffraction analysis. The entire sample corresponds to an analysis region, and thus, in-plane orientation of the structure is identical across the entire substrate. In other words, symmetric reflective surfaces of the structure each including a 6-fold axis are facing in the same direction across the entire film.

Next, the film was calcined in air to remove the surfactant. The film was heated to 550° C. at a temperature increase rate of 2° C./min, maintained at the temperature for 10 hours, and then cooled to room temperature. An infrared absorption spectroscopy or the like showed that no organic components remained in the calcined film.

Figure 9:
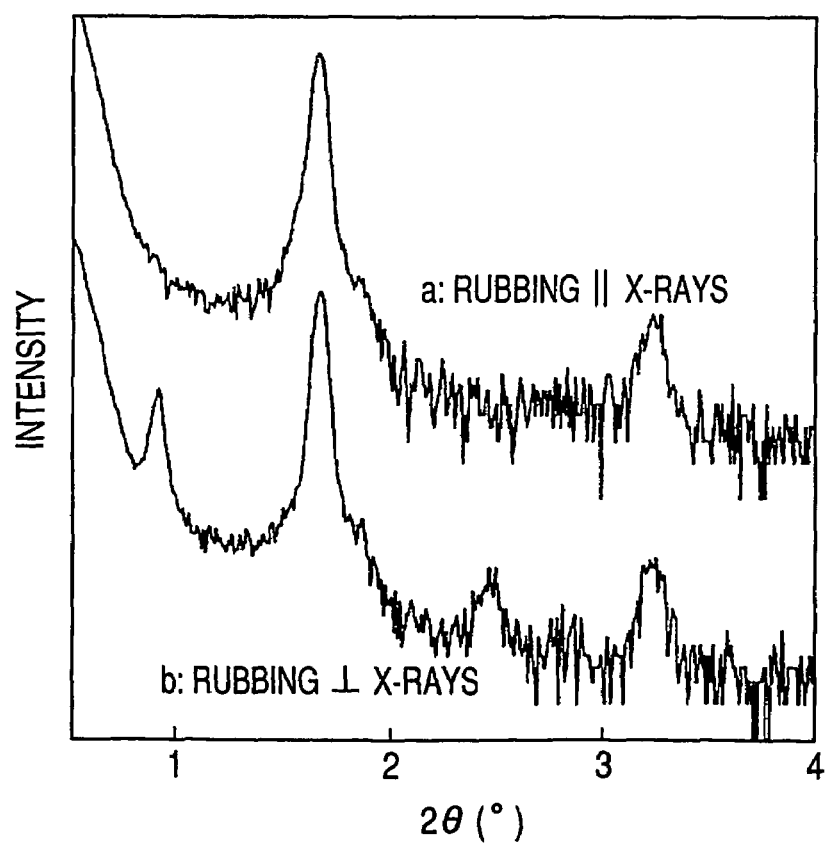
FIG. 9 shows θ-2θ scanning X-ray diffraction patterns measured for the mesostructured film produced in Example 3 of the present invention.

The calcined film was analyzed by X-ray diffraction, and diffraction peaks as in FIG. 9 were observed, thereby confirming that the structure was retained after removal of the surfactant. However, positions of the diffraction peaks shifted to higher angles as compared to peak positions in FIG. 9, indicating that a structural period perpendicular to the film plane was shortened by calcination. This results from shrinkage of the structure through dehydration condensation of silanol groups of silica constituting pore walls.

Figure 10:
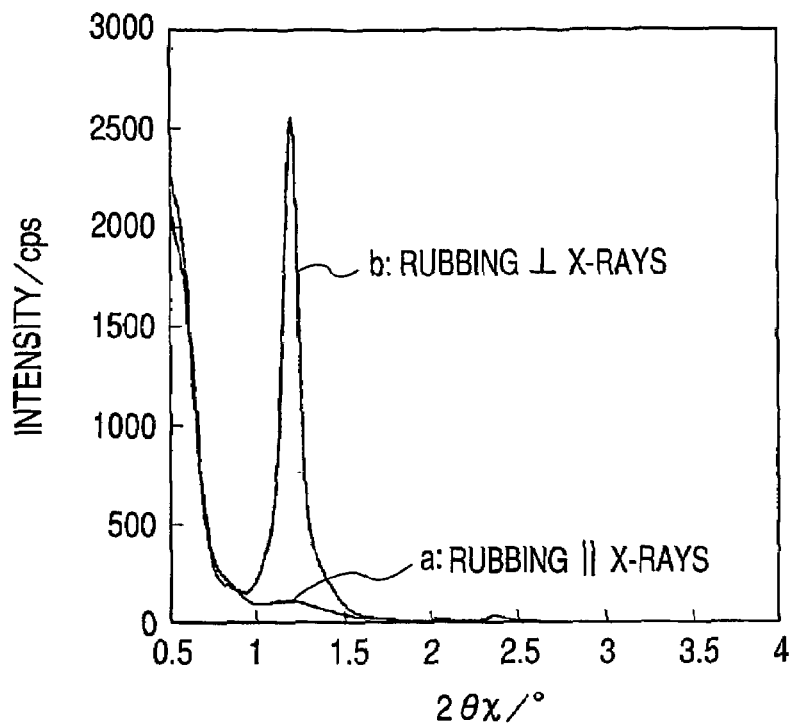
FIG. 10 shows in-plane diffraction patterns measured for the mesostructured film produced in Example 3 of the present invention.

Further, the calcined sample film was analyzed through in-plane X-ray diffraction, and diffraction patterns substantially identical to those in FIG. 10 were obtained, whereby it was confirmed that the shrinkage of the structure occurs only in a direction perpendicular to the substrate surface and the in-plane periodic structure does not change through calcination.

In-plane rocking curve was measured for the calcined sample by fixing a detector at positions of the in-plane diffraction peaks and rotating the sample. A pattern substantially identical to that in FIG. 11 was observed, indicating that in-plane structural regularity was slightly changed through removal of the surfactant by calcination.

The film produced in Example 3 upon X-ray analysis exhibited similar behavior to the film in Example 1, and thus, the film can be applied to the optical device described in Example 1.

EXAMPLE 4

In Example 4, a substrate having a Langmuir-Blodgett film formed thereon was first produced as in Example 2.

A mesostructured silica film was formed on the substrate. A surfactant used in Example 4 was the same as used in Example 3: a mixture of polyethylene oxide 20 hexadecyl ether ($C_{16}H_{33}(CH_2CH_2O)_{20}OH$, abbreviated as $C_{16}EO_{20}$ below) and polyethylene oxide 10 hexadecyl ether ($C_{16}H_{33}(CH_2CH_2O)_{10}OH$, abbreviated as $C_{16}EO_{10}$ below) mixed in a molar ratio of $C_{16}EO_{10}$:$C_{16}EO_{20}$=2:1.

A composition of the reactant solution for mesostructured silica film formation was the same as prepared in Example 3.

The substrate having a Langmuir-Blodgett film of polyimide B formed thereon was retained in the reactant solution with the side on which the film was to be formed facing down. The Teflon (trademark) vessel 21 of the constitution as shown in FIG. 2 containing the reactant solution, which is the same as in Example 1, was sealed for reaction at 80° C. for 3 days. A cover was placed on the surface through a spacer during reaction, thereby obtaining a satisfactory uniaxially oriented mesostructured silica film.

The substrate 25 held in contact with the reactant solution for a given time was taken out from the vessel, sufficiently washed with pure water, and naturally dried at room temperature. As a result, a continuous film of a mesostructured silica was formed. A thickness of the mesostructured silica film was determined using a stylus profilometer, and was about 500 nm.

The film was analyzed by θ-2θ scanning X-ray diffraction with CuKα radiation, and two diffraction peaks corresponding to plane interval of 5.3 nm and 2.7 nm similar to those in FIG. 9 were observed at positions of 1.66° and 3.24°, respectively. Anisotropy in the diffraction patterns as in Example 3 was observed between a case where the measurement was carried out in the direction of a substrate plane projection component of incident X-rays parallel with the transfer direction of the substrate during LB film formation and a case where the measurement was carried out in the direction perpendicular to the transfer direction of the substrate during LB film formation.

The structure of the film was more specifically analyzed through in-plane X-ray diffraction with CuKα radiation. As a result, two diffraction peaks were observed at $2\theta_X$=1.18° and 2.36° as in Example 3. The intensities of the diffraction peaks were small with measurement in such an initial arrangement that the substrate plane projection component of the incident X-rays was parallel with the transfer direction of the substrate during LB film formation. The intensities were large with measurement in such an initial arrangement that the substrate plane projection component of the incident X-rays was perpendicular to the transfer direction of the substrate during LB film formation, thereby confirming strong in-plane anisotropy in orientation of the lattice plane.

Next, a detector was fixed at a position of $2\theta_X$=1.18° in the in-plane X-ray diffraction analysis, and the sample was subjected to in-plane rotation, investigating the orientation of the plane. As a result, a substantially identical profile was obtained as in FIG. 11, and diffraction peaks were observed every 60° at equal intervals. The positions of the diffraction peaks were in directions of +150°, +90°, +30°, −30°, −90°, and −150° with respect to the transfer direction of the substrate during LB film formation.

From the above results, it was confirmed that the structure of the mesostructured film produced in the present invention includes a 6-fold axis perpendicular to the film plane, and that the distribution of the orientation is very narrow. An incident angle of X-rays was 0.2° in the in-plane X-ray diffraction analysis. The entire sample corresponds to an analysis region, and thus, in-plane orientation is identical across the entire substrate. In other words, symmetric reflective surfaces of the structure each including a 6-fold axis are facing in the same direction across the entire film.

The mesostructured silica film produced in Example 4 was then calcined under the same conditions as in Example 3 to remove the surfactant, thereby forming a mesoporous silica film.

The calcined film was analyzed by X-ray diffraction, and the result indicated that a structural period was shortened only in a thickness direction.

The film produced in Example 4 upon X-ray analysis exhibited similar behavior to the film in Example 1, and thus, the film can be applied to an optical device described in Example 1.

EXAMPLE 5

Example 5 is an example of production of a mesostructured silica and mesoporous silica film having a three-dimensional structure with in-plane orientation highly controlled across the entire substrate as in Examples 3 and 4 by using: a substrate having a polyimide film formed thereon and subjected to the same rubbing treatment as in Example 1; and a different surfactant from that in Examples 3 and 4.

A polyimide A film was formed on a silica glass substrate in the same manner as in Example 1, and the substrate was subjected to rubbing treatment under the same conditions as in Example 1.

A mesostructured silica film was formed on the substrate. A surfactant used in Example 5 was also a mixture of two kinds of surfactants respectively having hydrophilic polyethylene oxide portions different in size and having identical hydrophobic alkyl chains which are different in length from the alkyl chains of the surfactants used in Example 3. The surfactant used in Example 5 contained polyethylene oxide 20 octadecyl ether ($C_{18}H_{37}(CH_2CH_2O)_{20}OH$, abbreviated as $C_{18}EO_{20}$ below) and polyethylene oxide 10 octadecyl ether ($C_{18}H_{37}(CH_2CH_2O)_{10}OH$, abbreviated as $C_{18}EO_{10}$ below) mixed in a molar ratio of $C_{18}EO_{10}$: $C_{16}EO_{20}=1:3$.

0.16 g of $C_{18}EO_{10}$ and 0.76 g of $C_{18}EO_{20}$ were dissolved in 129 ml of pure water, and 20.6 ml of concentrated-hydrochloric acid (36%) was added thereto. After sufficient stirring of the mixture, 2.20 ml of tetraethoxysilane (TEOS) was further added to the solution, and was stirred for 3 minutes. The final molar ratio of respective components in the solution was $TEOS:H_2O:HCl:C_{18}EO_{10}:C_{18}EO_{20}=0.125:100:3:0.0028:0.0083$.

The substrate having polyimide A formed thereon and subjected to rubbing treatment was retained in the reactant solution with the side on which the film was to be formed facing down. The Teflon (trademark) vessel 21 containing the reactant solution, which is the same as in Examples 3 and 4, was sealed for reaction at 80° C. for 3 days. A cover was placed on the surface through a spacer during reaction, thereby obtaining a satisfactory uniaxially oriented mesostructured silica film.

The substrate 25 held in contact with the reactant solution for a given time was taken out from the vessel, sufficiently washed with pure water, and naturally dried at room temperature. As a result, a continuous film of a mesostructured silica was formed. The thickness of the mesostructured silica film was determined using a stylus profilometer, and was about 400 nm.

The film was analyzed by $\theta$-$2\theta$ scanning X-ray diffraction with CuKα radiation, and diffraction peaks corresponding to plane interval of 6.0 nm and 3.0 nm were observed at 1.47° and 2.95°, respectively. Anisotropy in the diffraction patterns as in Example 3 was observed between a case where the measurement was carried out in the direction of a substrate plane projection component of incident X-rays parallel with the rubbing direction and a case where the measurement was carried out in the direction of a substrate plane projection component of incident X-rays perpendicular to the rubbing direction.

The structure of the film was more specifically analyzed through in-plane X-ray diffraction with CuKα radiation. Two diffraction peaks were observed at $2\theta_\chi=1.12°$ and 2.20° through in-plane X-ray diffraction analysis. As in Example 3, the intensities of the diffraction peaks were small with measurement in such an initial arrangement that the substrate plane projection component of the incident X-rays was in parallel with the rubbing direction. The intensities were large with measurement in such an initial arrangement that the substrate plane projection component of the incident X-rays was perpendicular to the rubbing direction, thereby confirming strong anisotropy in an in-plane structure of the mesostructured silica produced in Example 5.

Next, a detector was fixed at a position of $2\theta_\chi=1.12°$ in the in-plane X-ray diffraction analysis, and the sample was subjected to in-plane rotation, investigating the orientation of the plane. As a result, sharp diffraction peaks were observed every 60° at equal intervals as in Example 3. The positions of the diffraction peaks were in directions of +150°, +90°, +30°, −30°, −90°, and 150° with respect to the rubbing direction. The full widths of the half maximum of the diffraction of in-plane rotation, which indicate orientation distribution, were substantially identical to those in Example 3.

From the above results, it was confirmed that the structure of the mesostructured film produced in Example 5 includes a 6-fold axis perpendicular to the film plane, indicating that the distribution of the orientation is very narrow. An incident angle of X-rays was 0.2° in the in-plane X-ray diffraction analysis. The entire sample corresponds to an analysis region, and thus, in-plane orientation of the structure is identical across the entire substrate. In other words, symmetric reflective surfaces of the structure each including a 6-fold axis are facing in the same direction across the entire film.

A mesostructured silica film having a narrow distribution in in-plane orientation was observed in Example 5 when two kinds of surfactants were used as a mixture in a molar ratio of $C_{18}EO_{10}:C_{18}EO_{20}=1:3$. This ratio differs from the ratio of the surfactants used in Example 3 which provided a narrow distribution in in-plane orientation. The mixing ratio of the surfactant having a small hydrophilic group and the surfactant having a large hydrophilic group used in Example 3 was $C_{16}EO_{10}:C_{16}EO_{20}=2:1$. The result indicated that the mixing ratio of the surfactants must be optimized by hydrophobic groups.

The mesostructured silica film produced in Example 5 was then calcined under the same conditions as in Examples 3 and 4 to remove the surfactant, thereby forming a mesoporous silica film.

The calcined film was analyzed by X-ray diffraction, and the result indicated that a structural period was shortened only in a thickness direction.

The film produced in Example 5 upon X-ray analysis exhibited similar behavior to the film in Example 1, and thus, the film can be applied to the optical device described in Example 1.

EXAMPLE 6

Example 6 is an example of production of: a mesostructured silica and mesoporous silica thin film having a three-dimensional structure with in-plane orientation highly controlled across the entire substrate using a substrate having a polyimide film formed thereon and subjected to rubbing treatment as in Example 1, through dip-coating; and an optical material thin film in soft X-ray region.

A polyimide A film was formed on a silica glass substrate in the same manner as in Example 1, and the substrate was subjected to rubbing treatment under the same conditions as in Example 1.

A mesostructured silica thin film was formed on the substrate. The surfactant used in Example 5 contained polyethylene oxide 10 hexadecyl ether ($C_{16}H_{33}(OCH_2CH_2)_{10}OH$, abbreviated as $C_{16}EO_{10}$ below)

0.55 g of $C_{16}EO_{20}$ was dissolved in 10 ml of ethanol (EtOH), and 2.08 g of tetraethoxysilane (TEOS) was added thereto. After sufficient stirring of the mixture, 0.40 g of 0.1 M hydrochloric acid and 0.5 ml of pure water were further added to the solution, and was stirred for 2 hours, thereby preparing a solution. The final molar ratio of respective components in the solution was $TEOS:EtOH:H_2O:HCl:C_{16}EO_{10}=1:22:5:0.004:0.08$.

The solution was applied through dip-coating onto the substrate having polyimide A formed thereon and subjected to rubbing treatment and was dried. A step of exposing the substrate to a steam atmosphere may be added. A continuous film of a mesostructured silica was formed on the substrate. The thickness of the mesostructured silica thin film was determined using a stylus profilometer, and was about 500 nm.

The film was analyzed by $\theta$-$2\theta$ scanning X-ray diffraction with CuKα radiation, and diffraction peaks were observed at 1.20° and 2.50°.

The structure of the thin film was more specifically analyzed through in-plane X-ray diffraction with CuKα radiation. A diffraction peak was observed at $2\theta_\chi=1.31°$ through in-plane X-ray diffraction analysis. As in Example 1, the intensity of the diffraction peak was small with measurement in such an initial arrangement that the substrate plane projection component of the incident X-rays was parallel with the rubbing direction. The intensity was large with measurement in such an initial arrangement that the substrate plane projection component of the incident X-rays was perpendicular to the rubbing direction, thereby confirming strong in-plane anisotropy in orientation of the lattice plane in the film produced in Example 6.

Next, a detector was fixed at a position of $2\theta_\chi=1.31°$ in the in-plane X-ray diffraction analysis, and the sample was subjected to in-plane rotation, investigating the orientation of the plane. As a result, sharp diffraction peaks were observed every 60° at equal intervals as in Example 1. The positions of the diffraction peaks were in directions of +150°, +90°, +30°, −30°, −90°, and −150° with respect to the rubbing direction.

From the above results, it was confirmed that the mesostructured thin film produced in Example 5 has a structure with a 6-fold axis perpendicular to the film plane, and that the distribution of the orientation is very narrow. Incident angle of X-rays was 0.2° in the in-plane X-ray diffraction analysis. The entire sample corresponds to an analysis region, and thus, in-plane orientation of the structure is identical across the entire substrate. In other words, symmetric reflective surfaces of the structure each including a 6-fold axis are facing in the same direction across the entire film.

The mesostructured silica produced in Example 5 was then calcined under the same conditions as those in. Example 1 to remove the surfactant, thereby forming a mesoporous silica thin film.

The calcined thin film was similarly analyzed by X-ray diffraction, and the result indicated that a structural period was shortened only in a thickness direction.

The thin film produced in Example 5 upon X-ray analysis exhibited similar behaviors to the thin film in Example 1, and thus, the film can be applied to an optical device described in Example 1.

EXAMPLE 7

Example 7 is an example of production of: a mesostructured silica and mesoporous silica thin film having a three-dimensional structure with in-plane orientation highly controlled across the entire substrate using a substrate having a polyimide film formed thereon and subjected to rubbing treatment as in Example 1, through spin-coating; and an optical material thin film in soft X-ray region.

A polyimide A film was formed on a silica glass substrate in the same manner as in Example 1, and the substrate was subjected to rubbing treatment under the same conditions as in Example 1.

A mesostructured silica thin film was formed on the substrate. A surfactant used in Example 7 was a mixture of two kinds of surfactants respectively having hydrophilic polyethylene oxide portions different in size and having identical hydrophobic alkyl chains. The surfactant used in Example 7 contained polyethylene oxide 20 hexadecyl ether ($C_{16}H_{33}(OCH_2CH_2)_{20}OH$, abbreviated as $C_{16}EO_{20}$ below) and polyethylene oxide 10 hexadecyl ether ($C_{16}H_{33}(OCH_2CH_2)_{10}OH$, abbreviated as $C_{16}EO_{10}$ below) mixed in a molar ratio of $C_{16}EO_{10}:C_{16}EO_{20}=2:1$.

0.32 g of $C_{16}EO_{10}$ and 0.26 g of $C_{16}EO_{20}$ were dissolved in 10 ml of ethanol (EtOH), and 2.08 g of tetraethoxysilane (TEOS) was added thereto. After sufficient stirring of the mixture, 0.40 g of 0.1 M hydrochloric acid and 0.5 ml of pure water were further added to the solution, and was stirred for 2 hours, thereby preparing the solution. The final molar ratio of respective components in the solution was TEOS:EtOH:$H_2O$:HCl:$C_{16}EO_{10}$:$C_{16}EO_{20}$=1:22.5:0.004:0.047:0.023.

The solution was applied through spin-coating onto the substrate having polyimide A formed thereon and subjected to rubbing treatment and was dried. Spin-coating was carried out at 2,000 rpm for 20 sec, for film formation. A continuous film of a mesostructured silica was formed. A thickness of the mesostructured silica thin film was determined using a stylus profilometer, and-was about 400 nm.

The film was analyzed by θ-2θ scanning X-ray diffraction with CuKα radiation, and diffraction peaks corresponding to plane interval of 5.4 nm and 2.7 ram were observed at 1.66° and 3.25°, respectively. Anisotropy in the diffraction patterns as in Example 3 was observed between a case where the measurement was carried out in the direction of a substrate plane projection component of incident X-rays parallel with the rubbing direction and a case where the measurement was carried out in the direction of a substrate plane projection component of incident X-rays perpendicular to the rubbing direction.

The structure of the thin film was more specifically analyzed through in-plane X-ray diffraction. Two diffraction peaks were observed at $2\theta_\chi=1.19°$ and 2.37° as in Example 3. As in Example 3, the intensities of the diffraction peaks were small with measurement in such an initial arrangement that the substrate plane projection component of the incident X-rays was parallel with the rubbing direction. The intensities were large with measurement in such an initial arrangement that the substrate plane projection component of the incident X-rays was perpendicular to the rubbing direction, thereby confirming strong in-plane anisotropy in orientation of the lattice plane of the film produced in Example 7.

Next, a detector was fixed at a position of $2\theta_\chi=1.19°$ in the in-plane X-ray diffraction analysis, and the sample was subjected to in-plane rotation, investigating the orientation of the plane. As a result, sharp diffraction peaks were observed every 60° at equal intervals as in Example 3. The positions of the diffraction peaks were in directions of +150°, +90°, +30°, −30°, −90°, and −150° with respect to the rubbing direction.

From the above results, it was confirmed that the mesostructured thin film produced in Example 7 has a structure with a 6-fold axis perpendicular to the film plane, and that the distribution of the orientation is very narrow. An incident angle of X-rays was 0.2° in the in-plane X-ray diffraction analysis. The entire sample corresponds to an analysis region, and thus, in-plane orientation of the structure is identical across the entire substrate. In other words, symmetric reflective surfaces of the structure each including a 6-fold axis are facing in the same direction across the entire film.

The mesostructured silica produced in Example 7 was then calcined under the same conditions as those in Example 1 to remove the surfactant, thereby forming a mesoporous silica thin film.

The calcined film was analyzed by X-ray diffraction, and the result indicated that a structural period was shortened only in a thickness direction.

The thin film produced in Example 7 upon X-ray analysis exhibited similar behaviors to the thin film in Example 1, and thus, the film can be applied to the optical device described in Example 1.

EXAMPLE 8

Example 8 is an example of production of: a mesostructured silica and mesoporous silica thin film each having a three-dimensional structure with in-plane orientation highly controlled across the entire substrate using a substrate having a polyimide film formed thereon and subjected to rubbing treatment as in Example 1, on an optional position of the substrate by soft lithography through dip-coating; and an optical material thin film in soft X-ray region.

A polyimide A film was formed on a silica glass substrate in the same manner as in Example 1, and the substrate was subjected to rubbing treatment under the same conditions as in Example 1.

A mesostructured silica thin film was formed on the substrate. A surfactant used in Example 8 was a mixture of two kinds of surfactants respectively having hydrophilic polyethylene oxide portions different in size and having identical hydrophobic alkyl chains. The surfactant used in Example 8 contained polyethylene oxide 20 hexadecyl ether ($C_{16}H_{33}(OCH_2CH_2)_{20}OH$, abbreviated as $C_{16}EO_{20}$ below) and polyethylene oxide 10 hexadecyl ether ($C_{16}H_{33}(OCH_2CH_2)_{10}OH$, abbreviated as $C_{16}EO_{10}$ below) mixed in a molar ratio of $C_{16}EO_{10}:C_{16}EO_{20}=2:1$.

0.32 g of $C_{16}EO_{10}$ and 0.26 g of $C_{16}EO_{20}$ were dissolved in 10 ml of ethanol (EtOH), and 2.08 g of tetraethoxysilane (TEOS) was added thereto. After sufficient stirring of the mixture, 0.40 g of 0.1 M hydrochloric acid and 0.5 ml of pure water were further added to the solution, and was stirred for 2 hours, thereby preparing the solution. The final molar ratio of respective components in the solution was $TEOS:EtOH:H_2O:HCl:C_{16}EO_{10}:C_{16}EO_{20}=1:22:5:0.004:0.047:0.023$.

A micromold, which is made from polydimethylsiloxane, was pressed onto a substrate having polyimide A formed thereon and subjected to rubbing treatment. A precursor solution was introduced into the mold by pouring the precursor solution from an edge of the mold and using capillarity, and was left standing for 5 hours, and then the mold was removed from the substrate, thereby obtaining a patterned mesostructured thin film. Upon observing the substrate having been dried in air, it was confirmed that a transparent thin film was formed only on the region coated with the precursor solution through soft lithography.

The film was analyzed by θ-2θ scanning X-ray diffraction with CuKα radiation, and diffraction peaks corresponding to plane interval of 5.4 nm and 2.7 nm were observed at 1.67° and 3.25°, respectively. Anisotropy in the diffraction patterns as in Example 3 was observed between a case where the measurement was carried out in the direction of a substrate plane projection component of incident X-rays parallel with the rubbing direction and a case where the measurement was carried out in the direction of a substrate plane projection component of incident X-rays perpendicular to the rubbing direction.

The structure of the thin film was more specifically analyzed through in-plane X-ray diffraction. Two diffraction peaks were observed at $2\theta_\chi=1.18°$ and $2.37°$ as in Example 3. As in Example 3, the intensities of the diffraction peaks were small with measurement in such an initial arrangement that the substrate plane projection component of the incident X-rays was parallel with the rubbing direction. The intensities were large with measurement in such an initial arrangement that the substrate plane projection component of the incident X-rays was perpendicular to the rubbing direction, thereby confirming strong in-plane anisotropy in orientation of the lattice plane in the film produced in Example 8.

Next, a detector was fixed at a position of $2\theta_\chi=1.18°$ in the in-plane X-ray diffraction analysis, and the sample was subjected to in-plane rotation, investigating the orientation of the plane. As a result, sharp diffraction peaks were observed every 60° at equal intervals as in Example 3. The positions of the diffraction peaks were in directions of +150°, +90°, +30°, −30°, −90°, and −150° with respect to the rubbing direction.

From the above results, it was confirmed that the mesostructured thin film produced in Example 8 has a structure with a 6-fold axis perpendicular to the film plane, and that the distribution of the orientation is very narrow. Incident angle of X,-rays was 0.2° in the in-plane X-ray diffraction analysis. The entire sample corresponds to an analysis region, and thus, in-plane orientation of the structure is identical across the entire substrate. In other words, symmetric reflective surfaces of the structure including a 6-fold axis are facing in the same direction across the entire film.

The mesostructured silica produced in Example 8 was then calcined under the same conditions as those in Example 1 to remove the surfactant, thereby forming a mesoporous silica thin film.

The calcined thin film was similarly analyzed by X-ray diffraction, and the result indicated that a structural period was shortened only in a thickness direction.

The thin film produced in Example 8 upon X-ray analysis exhibited similar behavior to the thin film in Example 1, and thus, the film can be applied to an optical device described in Example 1.

EXAMPLE 9

Example 9 is an example of production of: a mesostructured silica and mesoporous silica thin film having a three-dimensional structure with in-plane orientation highly controlled across the entire substrate using a substrate having a polyimide film formed thereon and subjected to rubbing treatment as in Example 1, on an optional position of the substrate through pen lithography; and an optical material thin film in soft X-ray region.

A polyimide A film was formed on a silica glass substrate in the same manner as in Example 1, and the substrate was subjected to rubbing treatment under the same conditions as in Example 1.

A mesostructured silica thin film was formed on the substrate. A surfactant used in Example 9 was a mixture of two kinds of surfactants respectively having hydrophilic polyethylene oxide portions different in size and having identical hydrophobic alkyl chains. The surfactant used in Example 9 contained polyethylene oxide 20 hexadecyl ether ($C_{16}H_{33}(OCH_2CH_2)_{20}OH$, abbreviated as $C_{16}EO_{20}$ below) and polyethylene oxide 10 hexadecyl ether ($C_{16}H_{33}(OCH_2CH_2)_{10}OH$, abbreviated as $C_{16}EO_{10}$ below) mixed in a molar ratio of $C_{16}EO_{10}:C_{16}EO_{20}=2:1$.

0.32 g of $C_{16}EO_{10}$ and 0.26 g of $C_{16}EO_{20}$ were dissolved in 10 ml of ethanol (EtOH), and 2.08 g of tetraethoxysilane (TEOS) was added thereto. After sufficient stirring of the mixture, 0.40 g of 0.1 M hydrochloric acid and 0.5 ml of pure water were further added to the solution, and was stirred for 2 hours, to thereby prepare the solution. The final molar ratio of respective components in the solution was $TEOS:EtOH:H_2O:HCl:C_{16}EO_{10}:C_{16}EO_{20}=1:22:5:0.004:0.047:0.023$.

Figure 12:
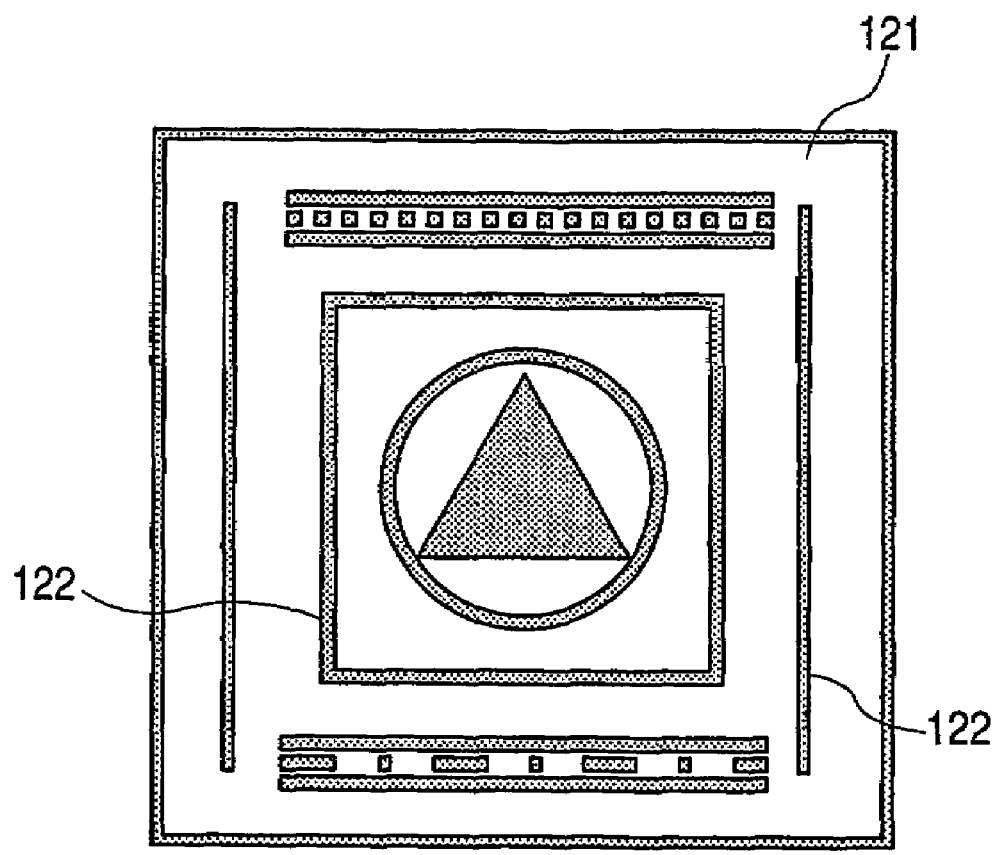
FIG. 12 is a schematic diagram illustrating a pattern of the mesostructured film produced in Example 8 of the present invention.

The solution was patterned on the substrate having polyimide A formed thereon and subjected to rubbing treatment through pen lithography as in FIG. 12, and was dried in air at room temperature. Conditions for pen lithography include a pen orifice of 50.0 μm, a substrate movement rate of 2.5 cm/s, and a fluid supply rate of 4.0 cm.

Upon observing the substrate having been dried in air, it was confirmed that a transparent thin film was formed only on the region coated with the solution through pen lithography.

The film was analyzed by θ-2θ scanning X-ray diffraction with CuKα radiation, and diffraction peaks corresponding to plane interval of 5.4 nm and 2.7 nm were observed at 1.66° and 3.24°, respectively. Anisotropy in the diffraction patterns as in Example 3 was observed between a case where the measurement was carried out in the direction of a substrate plane projection component of incident X-rays parallel with the rubbing direction and a case where the measurement was carried out in the direction of a substrate plane projection component of incident X-rays perpendicular to the rubbing direction.

The structure of the thin film was more specifically analyzed through in-plane X-ray diffraction. Two diffraction peaks were observed at $2\theta_x=1.18°$ and $2.36°$ as in Example 3. As in Example 3, the intensities of the diffraction peaks were small with measurement in such an initial arrangement that the substrate plane projection component of the incident X-rays was parallel with the rubbing direction. The intensities were large with measurement in such an initial arrangement that the substrate plane projection component of the incident X-rays was perpendicular to the rubbing direction, thereby confirming strong in-plane anisotropy in orientation of the lattice plane in the film produced in Example 9.

Next, a detector was fixed at a position of $2\theta_x=1.18°$ in the in-plane X-ray diffraction analysis, and the sample was subjected to in-plane rotation, to investigate the orientation of the plane. As a result, sharp diffraction peaks were observed every 60° at equal intervals as in Example 3. The positions of the diffraction peaks were in directions of +150°, +90°, +30°, −30°, −90°, and −150° with respect to the rubbing direction.

From the above results, it was confirmed that the mesostructured thin film produced in Example 9 has a structure with a 6-fold axis perpendicular to the film plane, and that the distribution of the orientation is very narrow. An incident angle of X-rays was 0.2° in the in-plane X-ray diffraction analysis. The entire sample corresponds to an analysis region, and thus, in-plane orientation is identical across the entire substrate. In other words, symmetric reflective surfaces of the structure each including a 6-fold axis are facing in the same direction across the entire film.

The mesostructured silica produced in Example 9 was then calcined under the same conditions as those in Example 1 to remove the surfactant, thereby forming a mesoporous silica thin film.

The calcined thin film was similarly analyzed by X-ray diffraction, and the result indicated that a structural period was shortened only in a thickness direction.

The thin film produced in Example 9 upon X-ray analysis exhibited similar behavior to the thin film in Example 1, and thus, the film can be applied to an optical device described in Example 1.

The film according to the present invention can be applied to X-ray optical devices.

This application claims priority from Japanese Patent Application Nos. 2003-290535 filed on Aug. 8, 2003 and 2004-029350 filed on Feb. 5, 2004, which is hereby incorporated by reference herein.

The invention claimed is:

1. A mesostructured film comprising amphiphilic molecular assemblies and a compound containing as a main component silica formed on the peripheries of the molecular assemblies regularly arranged three-dimensionally, the mesostructured film being formed on a substrate, wherein:

a local periodic structure in a section in parallel with the substrate of the film has a 6-fold axis perpendicular to a film plane; and symmetric reflective surfaces of the structure including the 6-fold axis are facing in the same direction across the entire film.

2. A mesostructured film according to claim 1, wherein the amphiphilic molecular assemblies comprise surfactant micelles containing two or more nonionic surfactants of different molecular length.

3. A mesostructured film according to claim 2, wherein the two or more nonionic surfactants of different molecular length comprise nonionic surfactants containing polyethylene oxide as a hydrophilic group.

4. A mesostructured film according to claim 3, wherein the two or more nonionic surfactants of different molecular length respectively have identical hydrophobic portions and hydrophilic polyethylene oxide portions different in molecular chain length.

5. X-ray optical device comprising the mesostructured film according to claim 1.

6. mesostructured film according to claim 1 having mesopores which are spherical.

7. A mesoporous material film comprising holes regularly arranged three-dimensionally and silica as a main component, the mesoporous material film being formed on a substrate, wherein:

a local periodic structure in a section of the film in parallel with the substrate has a 6-fold axis perpendicular to a film plane; and symmetric reflective surfaces of the structure including the 6-fold axis are facing in the same direction across the entire film.

8. A mesoporous material film according to claim 7, wherein the holes are spherical mesopores.

9. A structure comprising spherical assemblies of amphiphilic molecules and a compound containing silica formed on the peripheries of the assemblies, wherein:

the amphiphilic molecular assemblies are regularly arranged across an entire area of the structure; and the arrangement of the amphiphilic molecular assemblies has a 6-fold axis.

10. A structure according to claim 9, wherein the spherical assemblies are spherical mesopores.

11. A mesostructured film comprising: amphiphilic molecular assemblies arranged three-dimensionally in the mesostructured film on a substrate, wherein a local structure of the film has a 6-fold symmetry axis perpendicular to the film plane, and planes of mirror symmetry containing the symmetry axis are substantially parallel throughout the film.

12. A mesostructured film according to claim 11, wherein the amphiphilic molecular assemblies are spherical mesopores.

13. A mesostructured film having mesopores, wherein a local structure of the film has a 6-fold symmetry axis perpendicular to the film plane, and planes of mirror symmetry containing the symmetry axis are parallel throughout the film.

14. A mesostructured film according to claim 13, wherein the mesopores are spherical.

* * * * *